United States Patent
Atmaram et al.

(10) Patent No.: US 9,416,869 B2
(45) Date of Patent: Aug. 16, 2016

(54) CHANGE-OF-MIND SHIFT CONTROL OF A DUAL-CLUTCH TRANSMISSION

(71) Applicant: GM GLOBAL TECHNOLOGY OPERATIONS LLC, Detroit, MI (US)

(72) Inventors: Harinath Atmaram, Novi, MI (US); Ronald W. Van Diepen, Ann Arbor, MI (US); Matthew D. Whitton, Hartland, MI (US); Mateusz Nowak, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 14/477,199

(22) Filed: Sep. 4, 2014

(65) Prior Publication Data

US 2016/0069453 A1    Mar. 10, 2016

(51) Int. Cl.
| | |
|---|---|
| *F16H 61/688* | (2006.01) |
| *F16H 61/04* | (2006.01) |
| *F16H 59/46* | (2006.01) |
| *F16H 61/06* | (2006.01) |
| *B60W 10/113* | (2012.01) |
| *B60W 10/06* | (2006.01) |

(52) U.S. Cl.
CPC ............ *F16H 61/0437* (2013.01); *F16H 59/46* (2013.01); *F16H 61/06* (2013.01); *F16H 61/688* (2013.01); *B60W 10/06* (2013.01); *B60W 10/113* (2013.01); *B60W 2540/10* (2013.01); *B60W 2540/20* (2013.01); *B60W 2710/1005* (2013.01); *F16H 2059/462* (2013.01); *F16H 2061/0459* (2013.01); *F16H 2306/14* (2013.01); *F16H 2306/24* (2013.01); *F16H 2306/30* (2013.01); *F16H 2306/54* (2013.01)

(58) Field of Classification Search
None
See application file for complete search history.

(56) References Cited

U.S. PATENT DOCUMENTS

| | | | | |
|---|---|---|---|---|
| 4,875,391 A | * | 10/1989 | Leising | ............... F16H 61/0206 477/155 |
| 6,577,939 B1 | * | 6/2003 | Keyse | ................... F16H 61/061 477/34 |
| 7,384,374 B2 | * | 6/2008 | Jiang | ................... F16H 61/0437 477/120 |
| 7,933,706 B2 | * | 4/2011 | Ikeda | ...................... F16H 59/72 477/144 |
| 8,323,150 B2 | | 12/2012 | Atmaram et al. | |
| 8,433,487 B2 | * | 4/2013 | Ostberg | ................ F16H 61/688 701/64 |

\* cited by examiner

*Primary Examiner* — Ramya Burgess
*Assistant Examiner* — David Morris
(74) *Attorney, Agent, or Firm* — Quinn Law Group, PLLC

(57) ABSTRACT

A vehicle includes an engine, dual-clutch transmission (DCT), and controller. The controller executes a method to control a requested change-of-mind shift of the DCT to a second desired gear state. The requested shift is initiated after a prior-requested but not yet fully-executed shift of the DCT to a first desired gear state. The controller detects the requested shift, identifies the second desired gear state, and aborts the prior-requested shift immediately upon identifying the second desired gear state. The controller also shifts the DCT to the second desired gear state using a calibrated shift profile corresponding to the detected shift. The calibrated shift profile describes required oncoming and offgoing clutch torques needed for achieving the second desired gear state. Engine speed control may be used to synchronize engine and input shaft speeds.

15 Claims, 8 Drawing Sheets

CHANGE-OF-MIND SHIFT CONTROL OF A DUAL-CLUTCH TRANSMISSION

TECHNICAL FIELD

The present disclosure relates to the control of a change-of-mind shift maneuver in a vehicle having a dual-clutch transmission.

BACKGROUND

A dual-clutch transmission (DCT) combines features of manual and automatic transmissions. In a DCT, a first input clutch is applied to engage oddly-numbered gear sets of a gearbox, i.e., $1^{st}$, $3^{rd}$, $5^{th}$, and $7^{th}$ gear, while a second input clutch is applied to engage the evenly-numbered gear sets such as $2^{nd}$, $4^{th}$, $6^{th}$, and Reverse gear. A transmission control module predicts the next-selected or desired gear using various available control inputs such as engine acceleration and braking levels. The transmission control module then commands engagement of a fork synchronizer used for the desired gear ahead of application of the input clutch for that particular gear. The unique structure of a DCT may provide faster shift speeds relative to a conventional automatic transmission, with improved overall shift control and increased power.

SUMMARY

A system is disclosed herein that includes a dual-clutch transmission (DCT) and a controller. The controller is programmed to control a change-of-mind shift of the DCT when used in a vehicle as set forth herein. The term "change-of-mind shift" refers to a requested shift to another gear state that initiates before the completion of a prior-requested shift. For instance, a driver may change throttle and/or braking levels during the course of a prior-requested shift. The changed driver inputs can result in a new optimal transmission state, and thus the initiation of a different shift maneuver.

If the controller were to wait for the prior-requested shift to complete in the conventional manner before reacting to the changed driver inputs, the driver may perceive a hesitation or lag in the shift. The controller is therefore programmed as set forth herein to account for multiple different possible change-of-mind shifts via application of a selected calibrated clutch torque profile, with engine speed controls also used in some instances depending on the particular change-of-mind shift. The method performed by the controller allows a requested shift to a new gear state to be immediately aborted mid-shift. The control sequences described herein quicken the transition to the newly-requested gear state. To the extent possible, power flow is maintained through the driveline to provide a seamless transition to the newly-requested gear state. This in turn minimizes driveline disturbances while improving shift responsiveness, as well as providing continuous vehicle acceleration through the shift, when applicable.

In an example embodiment, the vehicle includes an internal combustion engine, a DCT, and a controller. The DCT includes a pair of input clutches, first/odd and second/even input shafts, and a gearbox containing separate oddly-numbered and evenly-numbered gear sets on the corresponding first and second shafts. Application of a designated one of the input clutches connects the engine to a corresponding one of the oddly-numbered or evenly-numbered gear sets on one of the two input shafts of the DCT. The controller, which is in communication with the two input clutches, includes a processor and tangible, non-transitory memory on which is recorded instructions for executing a change-of-mind shift from a first desired gear state to a second desired gear state.

In this embodiment, execution of the instructions causes the controller to detect the change-of-mind shift and identify the second desired gear state. The controller also aborts the initially-requested shift to the first desired gear state immediately upon identifying the second desired gear state, that is, without waiting for the prior-requested shift to the first desired gear state to complete in the conventional manner. The controller commands a shift of the DCT to the second desired gear state via a calibrated shift profile corresponding to the detected change-of-mind shift, i.e., a stored torque handoff profile describing the required oncoming and offgoing clutch torques for achieving the second desired gear state. Engine speed control may also be used in controlling some shift maneuvers.

The controller is programmed with a plurality of different calibrated shift profiles, including a profile for one or more power-on downshift-to-power-on downshift maneuvers, an upshift-to-power-on downshift maneuver, a coasting downshift-to-power-on downshift maneuver, an upshift-to-coasting upshift maneuver, a quick shift-to-quick shift maneuver, and a torque interrupt-to-power-on downshift maneuver. In such an embodiment, engine speed control may be used as part of the quick shift-to-quick shift and tip-in-to-power-on downshift maneuvers.

The power-on downshift-to-power-on downshift maneuvers may include a first shift maneuver to the first or second input shaft of the DCT from the same first or second input shaft and a second shift maneuver from the first input shaft to the second input shaft/from the second input shaft to the first input shaft.

The controller is programmed to shift the DCT to the second desired gear state via the calibrated shift profile by dropping clutch torque/torque capacity for a designated offgoing clutch according to a calibrated clutch exhaust profile immediately upon synchronization of engine speed with a speed of the particular input shaft of the DCT used for achieving the second desired gear state.

A temporary increase in engine speed may be requested by the controller, such as via transmission of a request to an engine control module, after detecting the change-of-mind shift in order to synchronize engine speed with input shaft speed.

A system and method are also disclosed. The system includes the DCT and the controller noted above. The method includes detecting the requested change-of-mind shift, including processing driver inputs via the controller, and identifying the second desired gear state. The method also includes aborting the prior-requested shift to the first desired gear state immediately upon identifying the second desired gear state and automatically shifting the DCT to the second desired gear state using a calibrated shift profile corresponding to the detected change-of-mind shift. The calibrated shift profile describes the required oncoming and offgoing clutch torques needed for achieving the second desired gear state.

The above features and advantages, and other features and advantages, of the present disclosure are readily apparent from the following detailed description of some of the best modes and other particular, embodiments for carrying out the invention, as defined in the appended claims, when taken in connection with the accompanying drawings.

DETAILED DESCRIPTION

Figure 1:
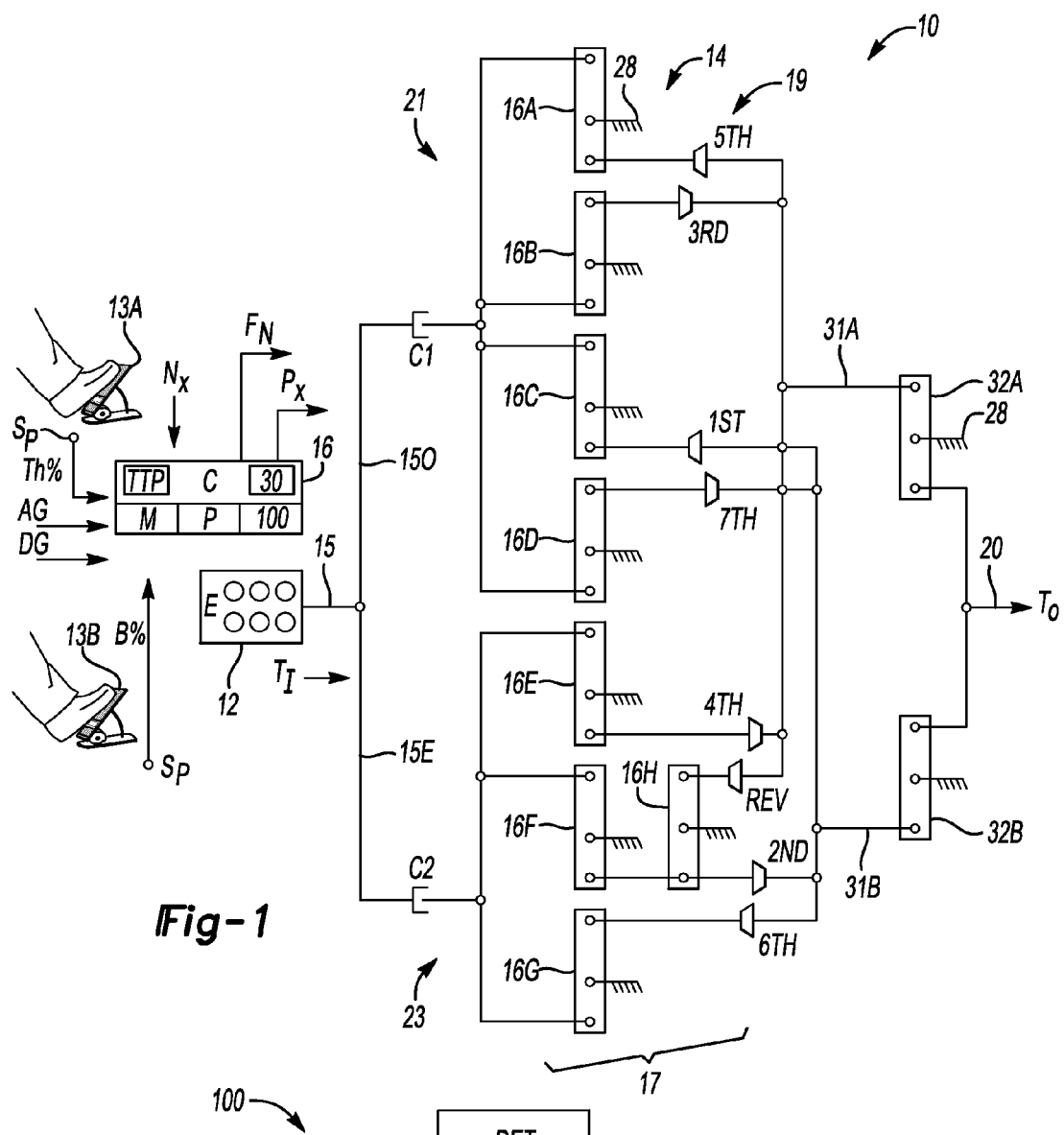
FIG. 1 is a schematic illustration of an example vehicle having a dual-clutch transmission (DCT) and a controller programmed to control a change-of-mind shift of the DCT as set forth herein.

Referring to the drawings, wherein like reference numbers refer to like components throughout the several Figures, an example vehicle 10 is shown schematically in FIG. 1. The vehicle 10 includes an internal combustion engine (E) 12 and a dual-clutch transmission (DCT) 14. The engine 12 is responsive to a received throttle level (arrow Th %) requested via a force applied to, or a corresponding percentage of travel of, an accelerator pedal 3M. The throttle level (arrow Th %) requests a relative level of input torque (arrow $T_I$) from the engine 12. The force/travel of the accelerator pedal 3M may be measured via a force or position sensor ($S_P$) in the conventional manner. The engine 12 also responds to a braking level (arrow B %) from a brake pedal 13B, with the braking level (arrow B %) likewise detected via a force or position sensor ($S_P$). In response to receipt of the throttle level (arrow Th %) by a controller (C) 16, e.g., an engine control module, the engine 12 delivers the input torque (arrow $T_I$) to the DCT 14 via an input member 15, or more precisely, one of two different input members 15E and 15O.

As explained below with reference to FIGS. 2 and 3A-G, the controller 16 is configured, i.e., specially programmed in software and equipped in hardware, to control various change-of-mind shifts of the DCT 14 in a manner that reduces shift delays and harshness. As used herein, the term "change-of-mind shift" refers to any shift of the DCT 14 from one speed ratio to another initiated after a prior-requested but not yet fully-executed shift. That is, driver inputs such as throttle level (arrow Th %) and braking level (arrow B %) may change during the course of a requested shift. Changes in driver input can result in a new optimal transmission state, which in turn would require a new shift to be initiated. The method 100 of FIG. 2 as implemented via the time plots of FIGS. 3A-G is intended to ensure that the change-of-mind shifts occur quickly and smoothly relative to conventional delayed approaches.

The example DCT 14 of FIG. 1 may be include a gearbox 17 and two independently-operated, non-lubricated respective first and second input clutches C1 and C2. While omitted from FIG. 1 for illustrative clarity, each input clutch C1 and C2 may include a center plate containing spaced friction discs, plates, or other suitable friction devices. The input clutches C1 and C2 are selectively compressed together via a fluid-actuated clutch piston or other suitable clutch actuator(s) (not shown), with these pistons having an axial position that is used in the overall control of the input clutches C1 and C2. Associated electronic and hydraulic clutch control devices (not shown) ultimately control the shift operations of the DCT 14, including change-of-mind shifts as noted above, in response to instructions or commands from the controller 16.

In the example DCT 14, the first input clutch C1 may be used to connect the engine 12 to any of the oddly-numbered gear sets 16A, 16B, 16C, and 16D, each having a node connected to a stationary member 28 of the DCT 14, for instance to establish respective fifth ($5^{th}$), third ($3^{rd}$), first ($1^{st}$), and seventh ($7^{th}$) gears in the example 7-speed transmission design of FIG. 1. The second input clutch C2 connects the engine 12 to reverse or any of the respective evenly-numbered gear sets 16E, 16F, and 16G, e.g., fourth ($4^{th}$), second ($2^{nd}$), and sixth ($6^{th}$) gears in the same example 7-speed transmission, as well as a reverse gear set 16H. Clutch forks and synchronizers 19 are shown schematically for the various gear sets. Using this type of gear arrangement, the DCT 14 can be rapidly shifted through its available range of gears without completely interrupting the power flow from the engine 12.

In the example vehicle 10 of FIG. 1, the DCT 14 also includes an output member 20 that is connected to a set of drive wheels (not shown). The output member 20 ultimately transmits output torque (arrow $T_o$) from the DCT 14 to the drive wheels in order to propel the vehicle 10. The DCT 14 may include a first input shaft 21 that is connected to the output side of the first input clutch C1, and also a second input shaft 23 that is connected to the output side of the second input clutch C2. The first input shaft 21 is connected to only the oddly-numbered gear sets 16A, 16B, 16C, and 16D. Likewise, the second input shaft 23 is connected to only the evenly-numbered gear sets 16E, 16F, and 16G and the reverse gear set 16H. The DCT 14 further includes upper and lower main shafts 31A and 31B, respectively, which may be connected to respective final drive gear sets 32A and 32B. The final drive gear sets 32A and 32B provide any required final gear reduction.

The controller 16 of FIG. 1 may be embodied as a microprocessor-based computing device or devices having a processor P and memory M, including but not necessarily limited to magnetic or optical read only memory (ROM), random access memory (RAM), electrically-erasable programmable read-only memory (EEPROM), flash memory, etc., and any required circuitry. The circuitry may include high-speed clocks, analog-to-digital (A/D) circuitry, digital-to-analog (D/A) circuitry, a digital signal processor, transceivers configured to transmit and receive any required signals during the overall control of the DCT 14, and the necessary input/output (I/O) devices and other signal conditioning and/or buffer circuitry.

The controller 16 determines or processes driver inputs such as throttle level (arrow Th %), braking level (arrow B %), vehicle speed (arrow Nx), the attained gear (arrow AG), i.e., the gear state the DCT 14 is currently in, and a desired gear (arrow DG) to be attained. The controller 16 ultimately outputs a clutch position control signal (arrow Px) to the designated input clutch C1 or C2 for a given shift to set the position of the designated input clutch C1 or C2, and fork control signals (arrow FN) to the corresponding clutch forks and synchronizers 19 for the desired gear. Thus, the input clutches C1 and C2 are referred to as "position-controlled" clutches.

The clutch position control signal (arrow Px) sets the axial or linear position of a clutch apply piston or other actuator device of the input clutch C1 or C2 for applying the input clutch C1 or C2, whichever one acts as the oncoming clutch during a requested shift. A torque-to-position (TTP) table and calibrated torque profiles 30, for instance the example profiles 30A-G of FIGS. 3A-G, respectively, may be recorded in memory M of the controller 16 and referenced to determine the required apply position for the input clutches C1 and C2, as is well known in the art of position-controlled clutches.

Figure 2:
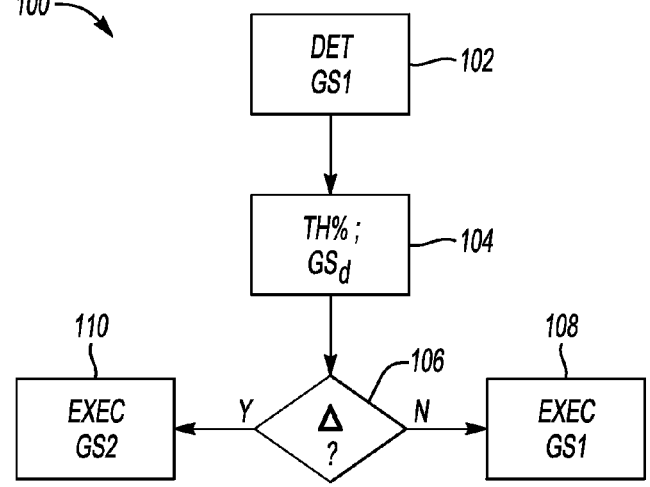
FIG. 2 is a schematic logic flow chart describing an example embodiment of a change-of-mind shift of the DCT shown in FIG. 1.

Referring to FIG. 2, an example embodiment of the method 100 is shown. The controller 16 of FIG. 1 executes logic embodying the method 100 from its memory M to quickly attain the gear state requested in a change-of-mind shift as noted above, while continuously transmitting torque to the drive wheels of the vehicle 10.

The method 100 begins with step 102, wherein the controller 16 of FIG. 1 detects a requested shift to a first desired gear state (DET GS1) of the DCT 14. The shift to the first desired gear state (GS1) may be detected by the controller 16 by processing all available inputs via the processor P, typically the throttle level (arrow Th %), braking level (arrow B %), attained gear (arrow AG), vehicle speed (arrow Nx), desired gear (arrow DG), and any other useful information such as input speed and output speed, i.e., from respective input and output speed sensors (not shown) positioned with respect to the shafts/members 21, 23, and 20. Step 102 also entails determining the type of shift that is requested, such as a power-on downshift, an upshift, a coasting downshift, a quick/tap shift, a quick shift-to-quick shift maneuver, and a torque interrupt-to-power-on downshift, all of which are explained with respect to FIGS. 3A-G below. The method 100 proceeds to step 104 once the first requested gear shift is detected and identified.

At step 104, the controller 16 continues to process the throttle level (arrow Th %) and other driver inputs from step 102, and determines the desired gear state ($GS_d$), i.e., the second desired gear state (GS2) to be achieved. As is known in the art of transmission controls, step 104 may entail calculating the speed ratio of the DCT 14 in response to the various inputs and identifying the desired gear state ($GS_d$) from this determination, whether via calculation or by accessing a calibrated shift table. The method 100 proceeds to step 106 once the desired gear state ($GS_d$) is known.

Step 106 includes comparing the desired gear state ($GS_d$) of step 104 to the first desired gear state (GS1) from step 102. If the desired gear state ($GS_d$) and the first desired gear state (GS1) are different, the controller 16 determines that a change-of-mind shift (Δ) has been detected and proceeds to step 110. The controller 16 proceeds to step 108 in the alternative if the desired gear state ($GS_d$) and the first desired gear state (GS1) of step 102 are the same gear state.

At step 108, the controller 16 of FIG. 1 executes the initially-requested gear shift, i.e., the first desired gear state (GS1) of step 102, in the usual manner. Step 108 may include, for instance, applying the corresponding input clutch C1 or C2 via transmission of the clutch position control signals (arrow Px) to the clutch actuator used for the input clutch C1 or C2, as well as hydraulic control of the associated forks and synchronizer(s) 19 needed for the requested shift. The DCT 14 shifts into the first desired gear state (GS1). The method 100 begins anew at step 102.

At step 110, the controller 16 immediately aborts the initially-requested shift to the first desired gear state (GS1) from step 102 and instead executes the change-of-mind shift to quickly enter the newly-requested/second desired gear state (GS2). Via execution of step 110, the controller 16 determines the oncoming and offgoing clutch torques needed for designated oncoming and offgoing clutches of the DCT 14 to achieve the new desired gear state and transmits the clutch position control signals (arrow Px) to the particular input clutch C1 and/or C2 involved in the change-of-mind shift. In some embodiments, step 110 may also include requesting speed control of the engine 12 as described below with reference to FIGS. 3F and 3G.

Step 110 also includes selecting a calibrated profile 30A-G of FIGS. 3A-G, respectively, for the specific type of change-of-mind shift. The calibrated profiles 30A-G determine both the timing and the magnitude of the clutch torques and various shaft speeds needed for quickly achieving the change-of-mind shift. Example profiles 30A-G will now be explained with reference to respective FIGS. 3A-G.

Figure 3A:
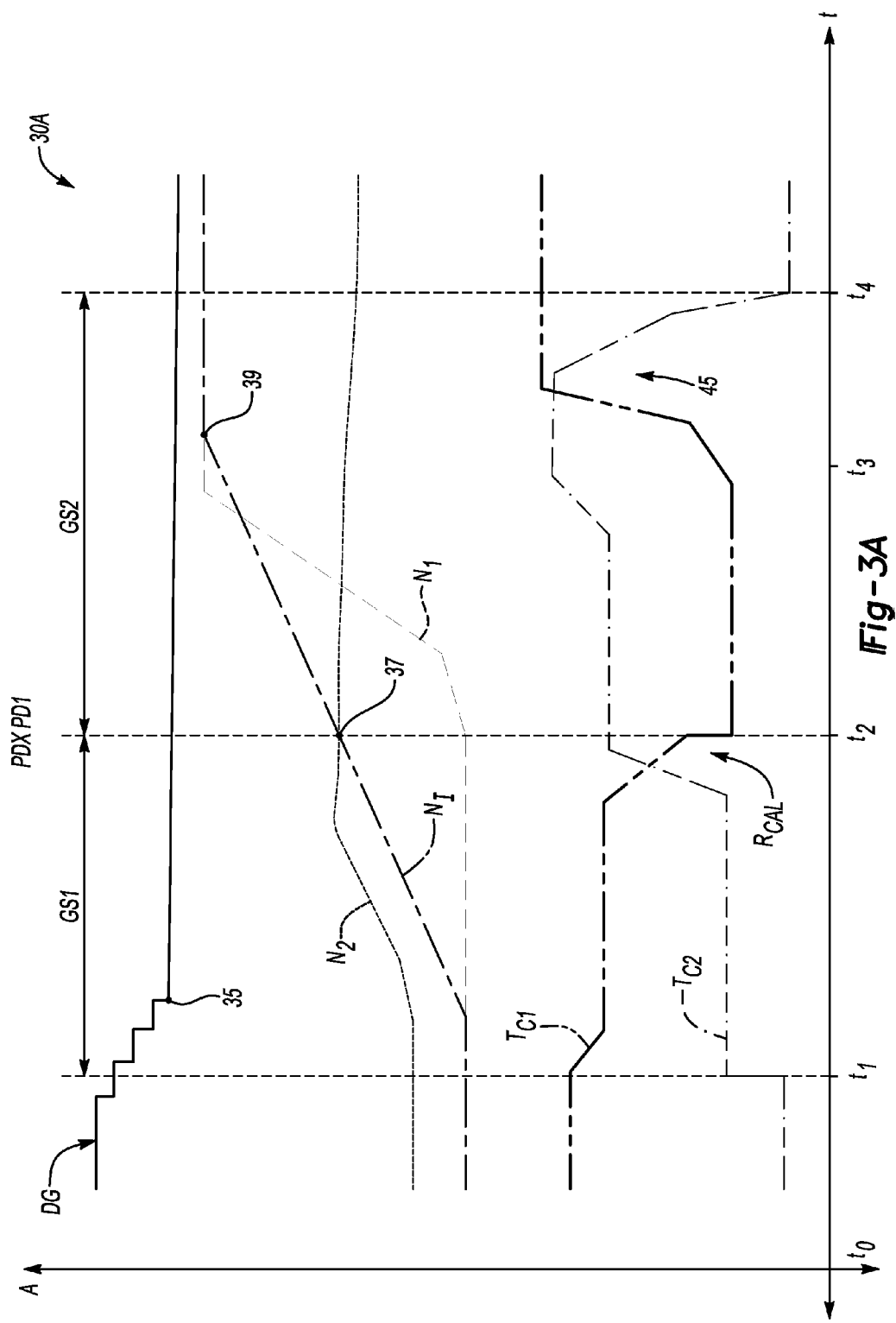
FIGS. 3A-G are time plots describing vehicle control parameters for control of various example change-of-mind shifts of the DCT shown in FIG. 1, with amplitude depicted on the vertical axis and time depicted on the horizontal axis.
Figure 3B:
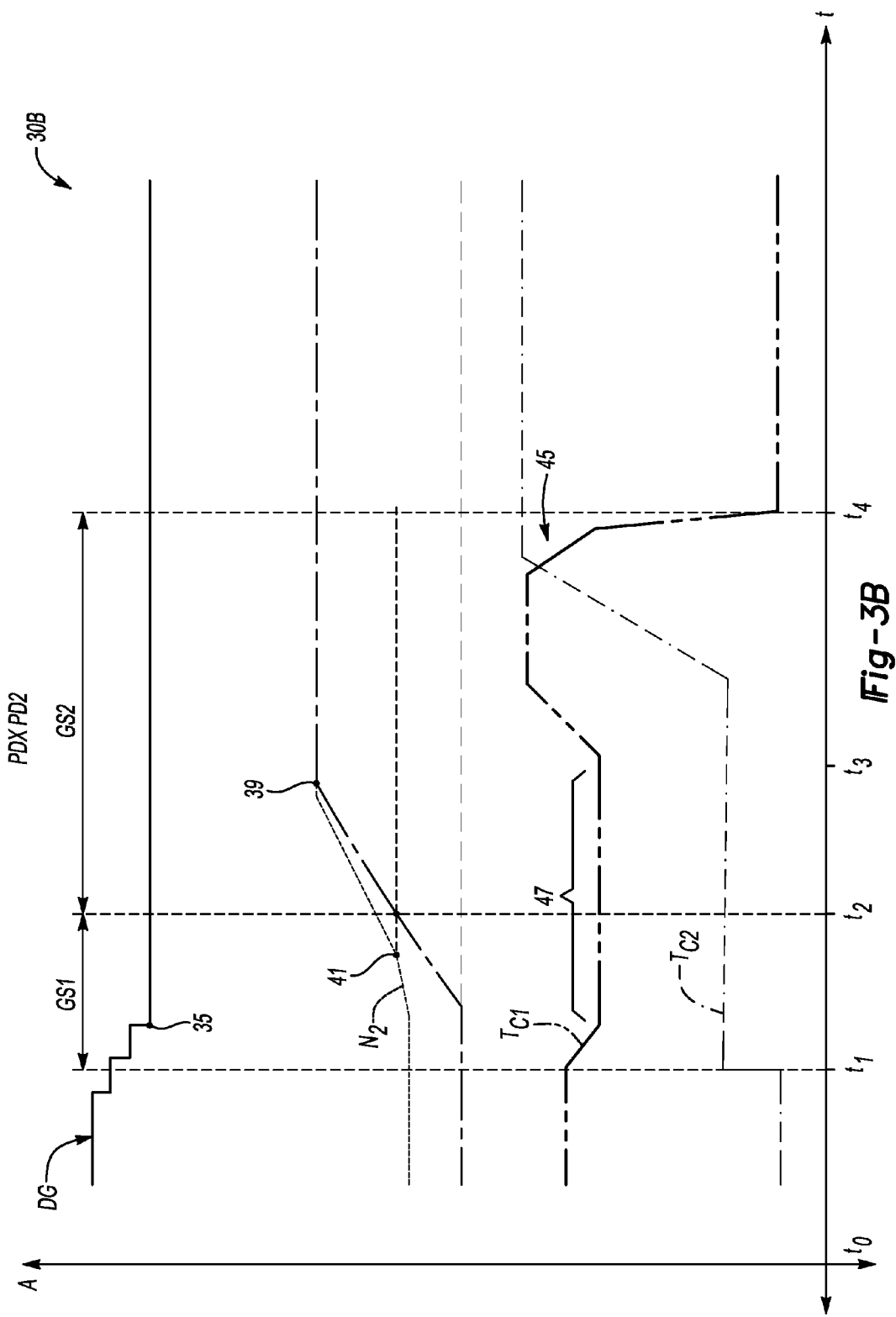

FIGS. 3A and 3B depict power-on downshift-to-power-on downshifts labeled as PDXPD1 and PDXPD2, respectively. The shift described by the calibrated shift profile 30A of FIG. 3A is a shift to the same input shaft 21 or 23. The shift of the calibrated shift profile 30B of FIG. 3B is a shift to a different shaft 21 or 23. An example shift in FIG. 3A is an initially-requested 5-4 power-on downshift in which a driver changes some inputs mid-shift to thereby request a 5-3 power-on downshift. In a 5-3 power-on downshift, the initially-requested gear state ($5^{th}$ gear) and the newly-requested gear state ($3^{rd}$ gear) are both oddly-numbered gear states, and thus the gear sets 16A and 16B are on the same shaft, i.e., input shaft 21 as shown in FIG. 1. The shift of FIG. 3B by comparison could be, for instance, a 6-5 power-on downshift changed mid-shift to a 6-3 power-on shift such that the input shaft must change from even ($6^{th}$) to odd ($3^{rd}$), i.e., from the input shaft 23 to the input shaft 21.

Power-on downshifts are referred to in the art as "offgoing clutch-controlled shifts". That is, the designated offgoing clutch is position-controlled to affect the torque handoff from the offgoing clutch to the designated oncoming clutch. However, in the profile 30A shown in FIG. 3A, which is a "same-shaft" power-on downshift as noted above, there are two different controlling clutches: the first input clutch C1 for achieving the initially-requested gear state and the second input clutch C2 for achieving the newly-requested/second desired gear state (GS2).

An input to the controller 16 of FIG. 1 is the initial desired gear (trace DG). This value corresponds to the desired gear (arrow DG) of FIG. 1. A shift to the initially-requested or first desired gear state (GS1) is ongoing between $t_0$ and $t_1$, with the change-of-mind shift being detected at about point 35. The newly-requested/second desired gear state (GS2) initiated via a change-of-mind shift commences at $t_2$ and continues until $t_4$. Also shown in FIG. 3A is a first shaft speed (trace $N_1$) describing the rotational speed of the input shaft 21, a second shaft speed (trace $N_2$) describing the rotational speed of the input shaft 23, and an input speed (trace $N_I$) which is the rotational speed of the input member 15 of FIG. 1, or the speed of the engine 12 of FIG. 1. The particular input shafts 21, 23 used for the first and second shaft speeds (traces $N_1$ and $N_2$, respectively) will vary in other shift maneuvers. Clutch torques (traces $T_{C1}$ and $T_{C2}$) are also shown indicating the clutch torque capacity of the input clutches C1 and C2 of FIG. 1, respectively, along with a calibrated ramp profile (trace $R_{CAL}$) as discussed below.

Absent execution of the present method 100, the normal synchronization point for a change-of-mind shift would be reached at about $t_2$, as indicated by point 37. However, the controller 16 upon detecting the change-of-mind shift at point 35 per step 106 of FIG. 2 executes the calibrated ramp profile (trace $R_{CAL}$) shortly before $t_2$ as shown. The profile or slope of trace $R_{CAL}$ is predetermined and stored in memory M of the controller 16 to provide the desired shift feel, with a steeper ramp producing a faster change in input speed (trace $N_1$), i.e., engine speed. Torque is handed off from input clutch C1, which is the offgoing clutch for the initially-requested shift, to the input clutch C2, i.e., the oncoming clutch.

At about $t_3$, the first shaft speed (trace $N_1$) is at its required level. The first shaft speed (trace $N_1$) and the input speed (trace $N_I$) to the DCT 14 are synchronized at point 39. The change-of-mind shift first detected at point 35 is thus ready to occur at about $t_3$. The clutch torque (trace $T_{C2}$) for input clutch C2, which is the offgoing clutch for the change-of-mind shift shown in FIG. 3A, is rapidly dropped between $t_3$ and $t_4$ according to a calibrated clutch exhaust profile 45. Torque capacity of the oncoming clutch, which is the input clutch C1 in this example, rapidly rises shortly after $t_3$. The change-of-mind shift is completed at about $t_4$, with the DCT 14 thereafter operating in the newly-requested/second desired gear state (GS2).

FIG. 3B shows the shift of FIG. 3A for a slightly different "PDXPD2" shift. As noted above, in FIG. 3B the PDXPD2 shift is a power-on-to-power-on downshift maneuver occurring to the opposite input shaft 21 or 23, e.g., a 6-5 power-on downshift with a change of mind to a 6-3 power-on downshift. Here, the same offgoing clutch, which is the input clutch C1 in this example, controls the entire shift. For the example 6-5 initially-requested power-on downshift, $5^{th}$ gear is attained at about point 41, with the change-of-mind shift detected slightly earlier at point 35.

Upon detection of the change-of-mind shift the controller 16 of FIG. 1 controls slip of the input clutch C1 in a slip control region 47, such as by using proportional-integral-derivative control logic of the controller 16. In the slip control region 47, the controller 16 commands pressure to a required clutch fork for $3^{rd}$ gear, that is, the change-of-mind gear first detected at point 35 via execution of step 104 of FIG. 2. Thereafter, torque is offloaded according to exhaust profile 45 from the offgoing clutch, which is input clutch C1, to the oncoming clutch or input clutch C2. The change-of-mind shift is complete at $t_4$.

Figure 3C:
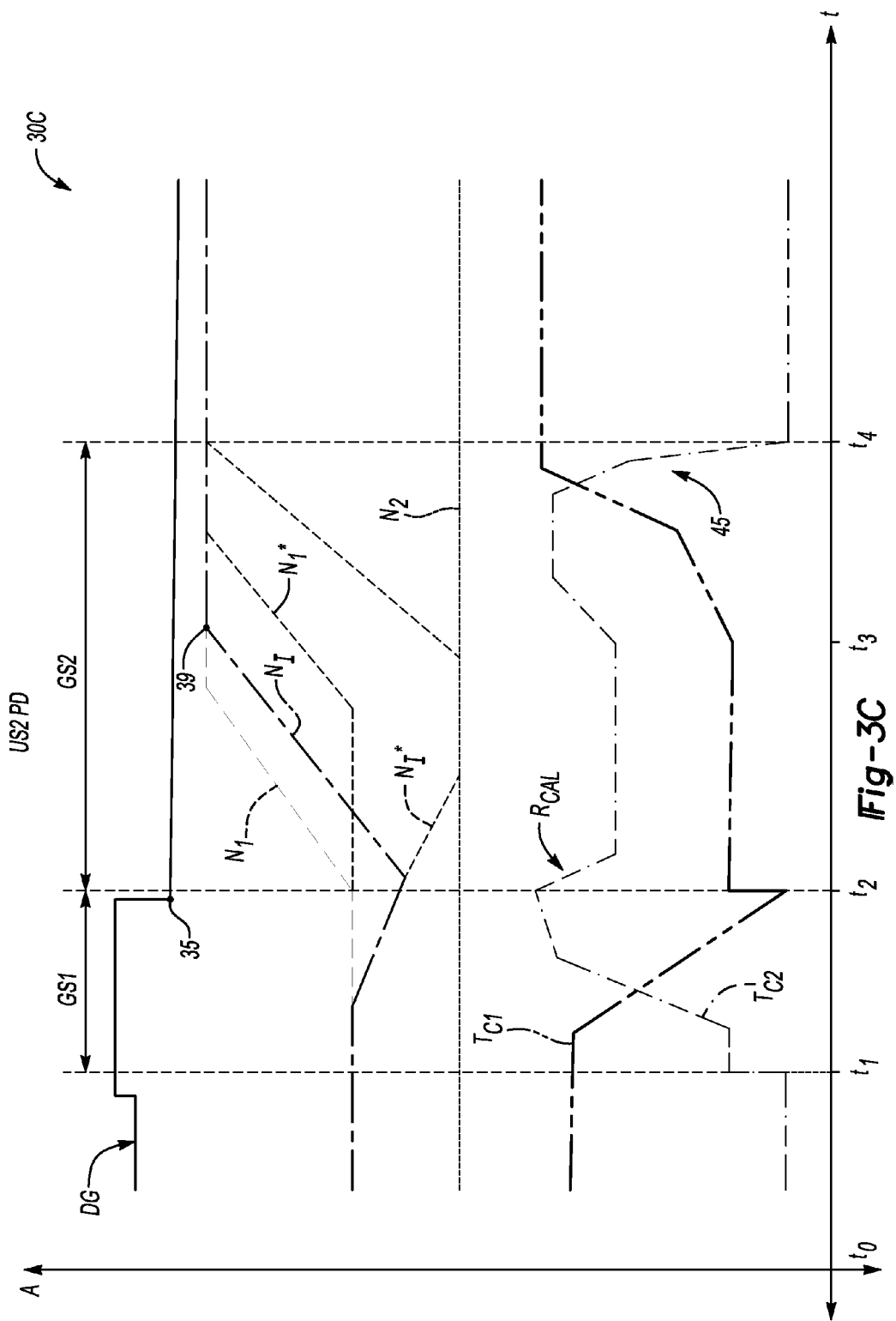

FIG. 3C depicts another calibrated profile 30C for a change-of-mind shift from an upshift-to-power-on downshift (US2PD) maneuver. Typical trajectories are shown for input speed (trace $N_I^*$) and shaft speed (trace $N_1^*$) absent execution of the method 100. The calibrated shifts profile 30C, as with the calibrated shift profiles 30A and 30B of respective FIGS. 3A and 3B described above, detects the change-of-mind shift at about point 35. Thereafter, the calibrated ramp profile (trace $R_{CAL}$) is executed for this shift to offload torque from the offgoing clutch, i.e., the input clutch C2 in this example, to the oncoming clutch/input clutch C1. The process of offloading torque according to the profile 30C is via access to the TTP table (TTP) of FIG. 1, with the corresponding position for the respective input clutches C1 and C2 being extracted from the TTP table and commanded via the clutch position control signals (arrow Px) of FIG. 1.

As torque is offloaded from the input clutch C2, the first shaft speed (trace $N_1$) rises shortly after $t_2$ along with the input speed (trace $N_1$), with the input speed (trace $N_1$) lagging behind the first shaft speed (trace $N_1$). The input speed (trace $N_1$) and the first shaft speed (trace $N_1$) are the same, i.e., synchronized, at point 39. As in this example the input shaft 23 is not used and the second shaft speed (trace $N_2$) remains at or near zero. After point 39, exhaust profile 45 is executed to drop the clutch torque (trace $T_{C2}$) for the offgoing clutch and raise clutch torque (trace $T_{C1}$) for the oncoming clutch, thereafter completing the change-of-mind shift at $t_4$.

Figure 3D:
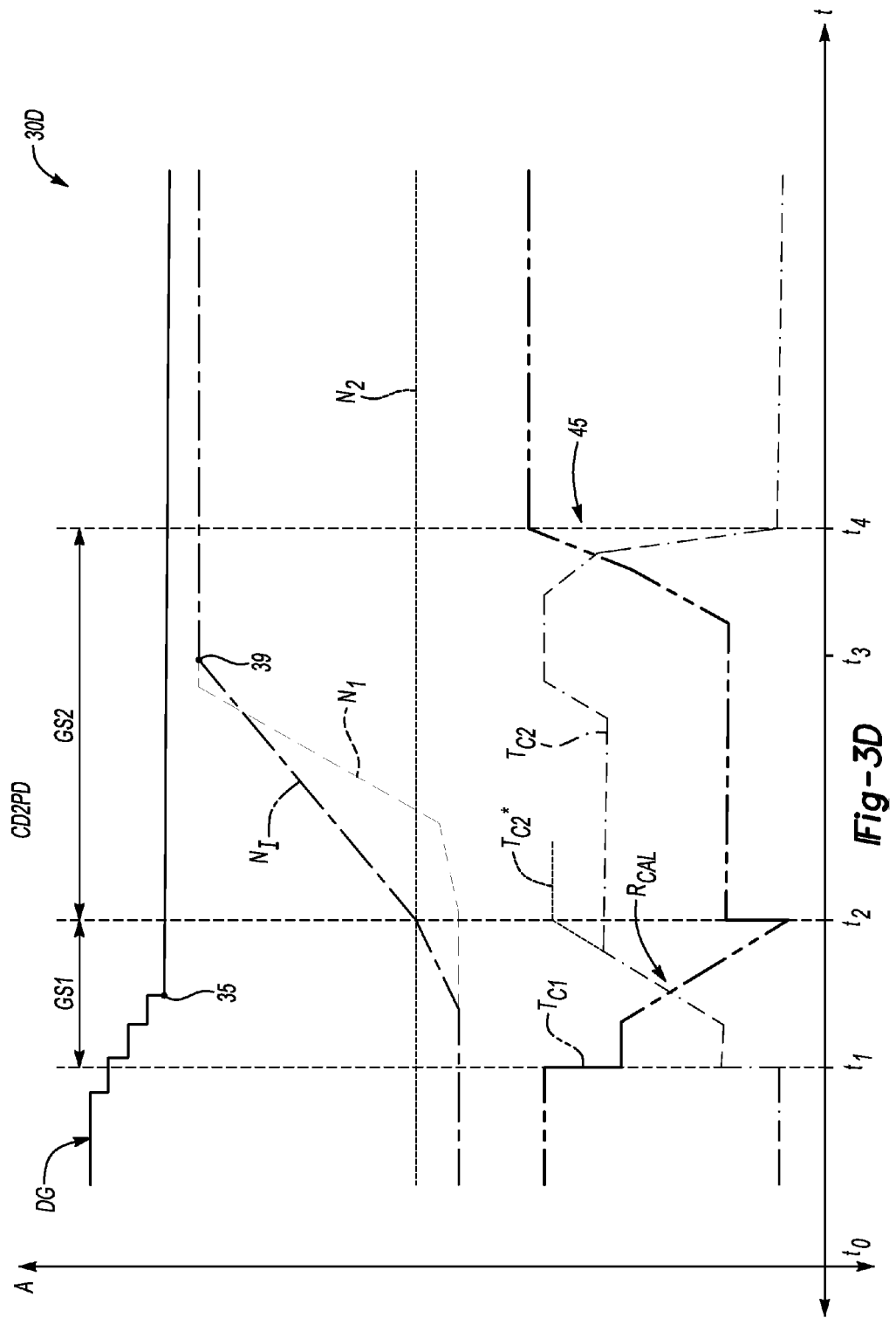

FIG. 3D depicts a calibrated profile 30D for a change-of-mind shift from a coasting downshift-to-power-on downshift (CD2PD) maneuver. Trajectories are shown for input speed (trace $N_1$) and the first shaft speed (trace $N_1$). The calibrated profile 30D detects the change-of-mind shift at point 35 during the initially-requested/first desired gear state (GS1). Prior to $t_2$, the controller 16 drops the clutch torque (trace $T_{C1}$) for the offgoing clutch C1 for this maneuver while increasing the clutch torque (trace $T_{C2}$) for the oncoming clutch C2. For comparison, the trace $T_{C2}^*$ depicts the ordinary trajectory of oncoming clutch torque $T_{C2}$ absent the method 100. That is, the clutch torque $T_{C2}$ would not plateau until about $t_2$. In executing the method 100, however, clutch torque plateaus immediately upon detection of the change-of-mind shift at point 35.

The calibrated profile (trace $R_{CAL}$) is executed and the clutch torques (traces $T_{C1}$ and $T_{C2}$) are held steady until the input speed (trace $N_1$) and the first shaft speed (trace $N_1$) are synchronized just before $t_3$. At point 39, which coincides with the synchronizing of the speeds (traces $N_1$ and $N_1$), the controller 16 increases the clutch torque (trace $T_{C2}$), holds this increased clutch torque for a calibrated duration, and executes the exhaust profile 45 to quickly release the offgoing clutch, which is the input clutch C2 in this example. The controller 16 then commands application of the oncoming clutch C1 via the clutch position control signals (arrow Px). The change-of-mind shift is complete at $t_4$.

Figure 3E:
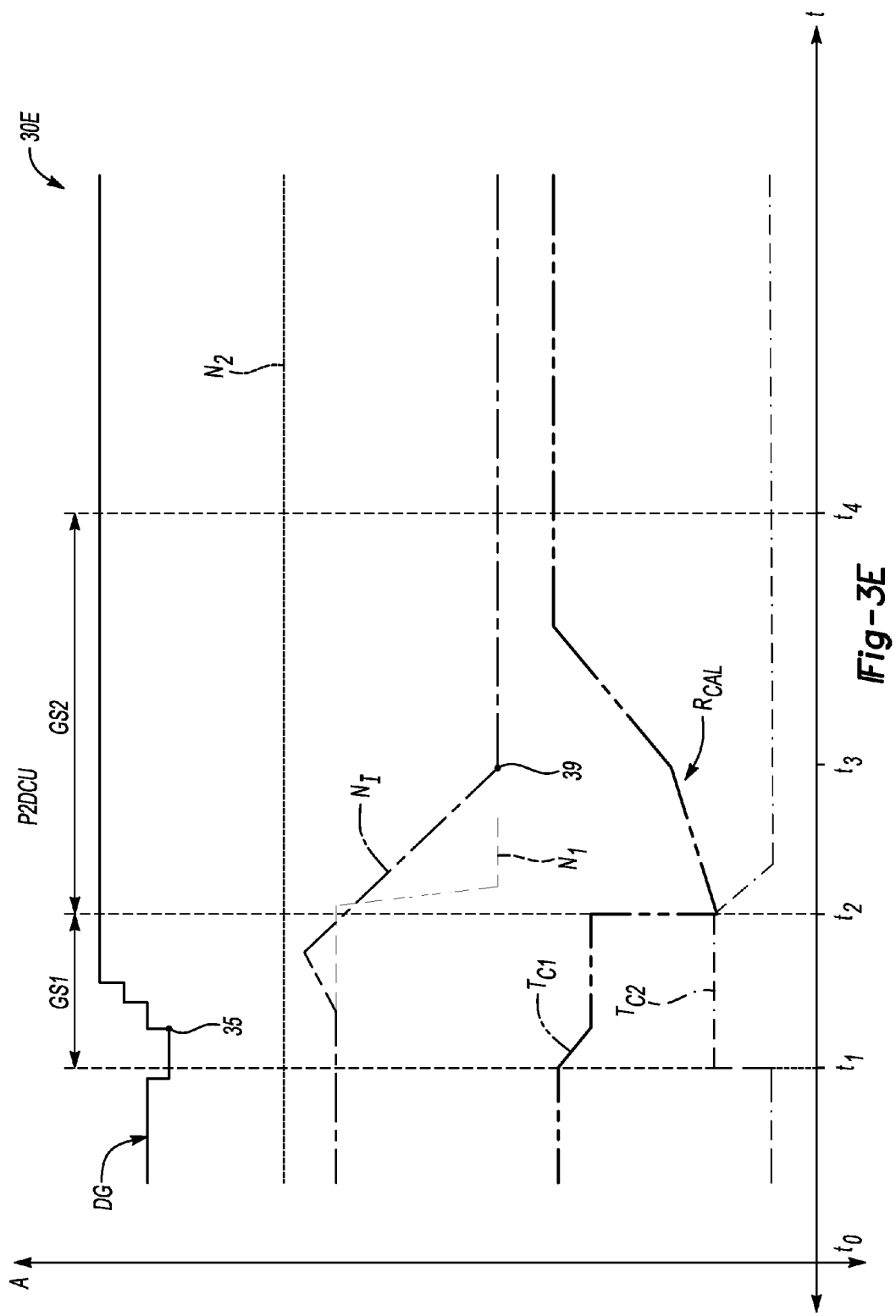

FIG. 3E shows yet another change-of-mind shift maneuver, this time a power-on downshift-to-coasting upshift (PD2CU) maneuver, which is essentially the opposite shift maneuver from that shown in FIG. 3D. Trajectories are shown for input speed (trace $N_I$) and first shaft speed (trace $N_1$). Again, the second shaft speed (trace $N_2$) is steady or zero, as it has no role to play in the shift of calibrated shift profile 30E. The calibrated shift profile 30E detects the change-of-mind shift at point 35 during the shift to the first desired gear state (GS1). The controller 16 executes the calibrated ramp (trace $R_{CAL}$) prior to $t_2$. The controller 16 drops the clutch torque (trace $T_{C1}$) for clutch C1 while holding the clutch torque (trace $T_{C2}$) steady for clutch C2. The change-of-mind shift at point 35 is detected. The input clutch C2 is not required in a coasting upshift involving the input clutch C1, and thus the controller 16 ramps down the clutch torque (trace $T_{C2}$) to zero at a calibrated ramp suitable for optimizing feel of the release. The input clutch C2 is thereafter uninvolved in the maneuver.

At about $t_2$, the falling input speed (trace $N_1$) coincides with the first shaft speed (trace $N_1$). At this point, the controller 16 quickly drops clutch torque (trace $T_{C1}$) to a minimal level as shown before slowly increasing the clutch torque (trace $T_{C1}$) at a first rate until point 39 is achieved, i.e., the input speed (trace $N_1$) and first shaft speed (trace $N_1$) are synchronized. At this point, around $t_3$, the controller 16 ramps clutch torque of the input clutch C1 to full capacity as shown, with the shift maneuver completed at $t_4$.

Figure 3F:
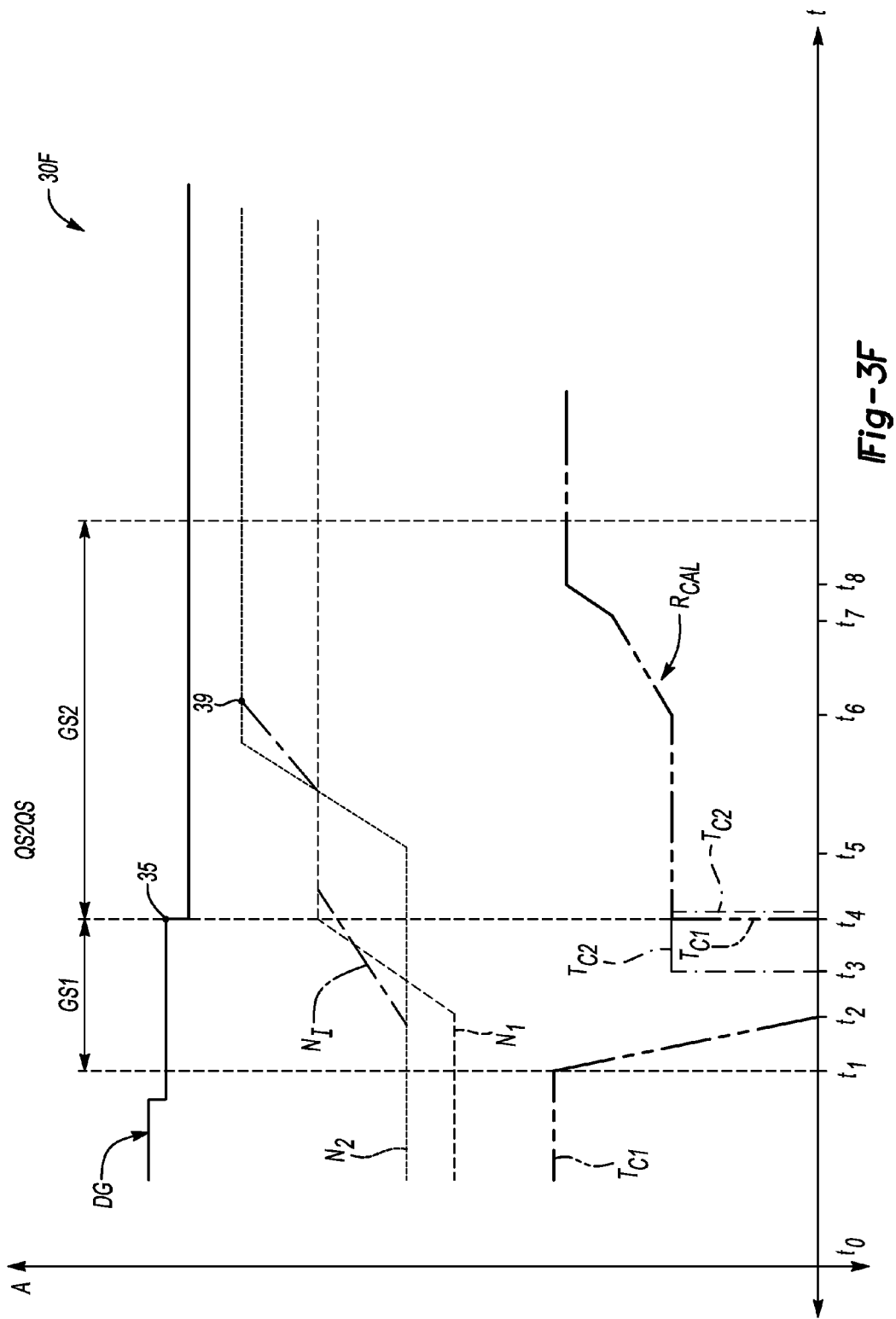
Figure 3G:
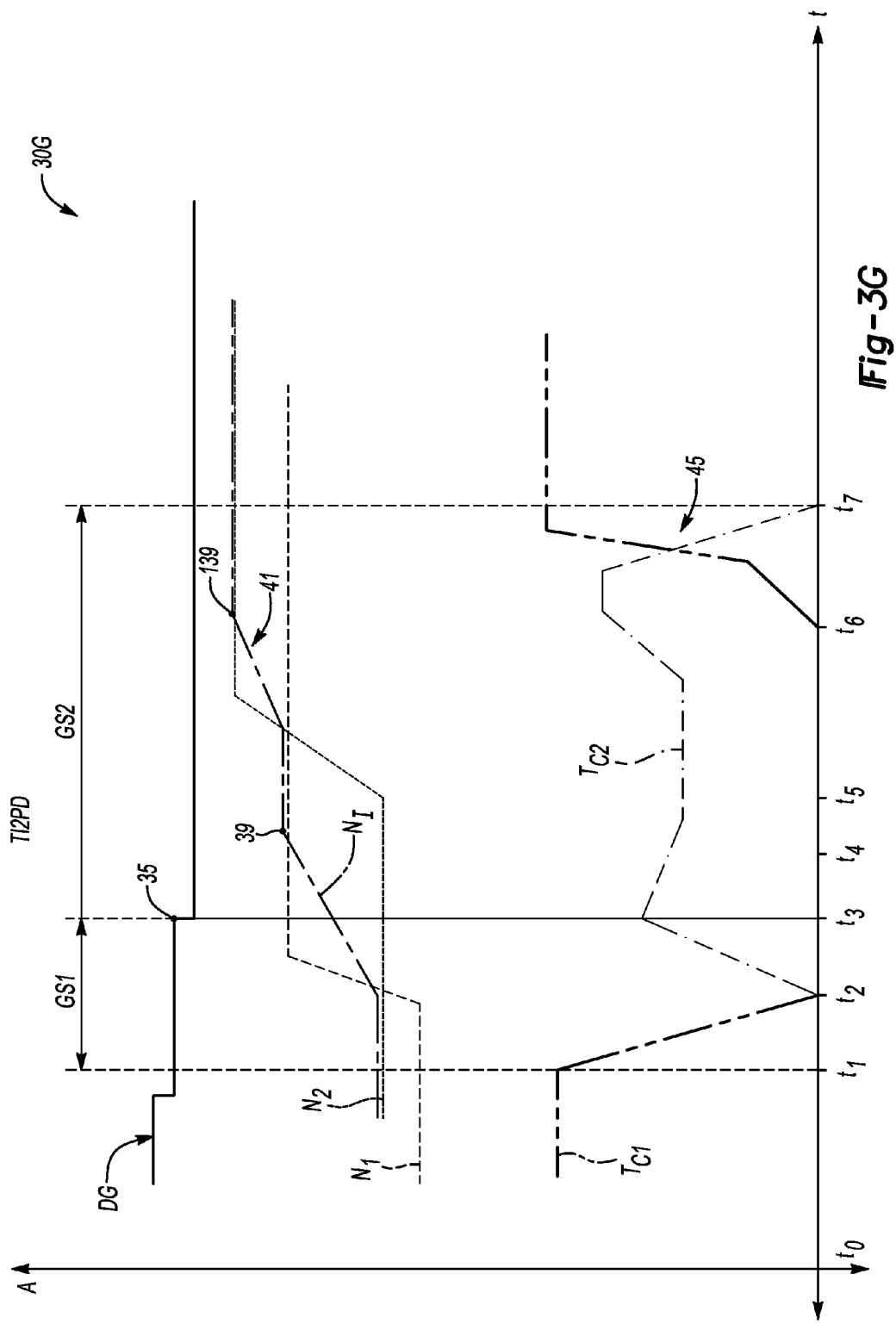

FIGS. 3F and 3G describe two additional change-of-mind shifts of the DCT 14 of FIG. 1. FIGS. 3F and 3G differ from FIGS. 3A-3E in part due to the use of speed control of the engine 12 to enforce the respective shift profiles 30F and 30G. Referring first to FIG. 3F, the calibrated shift profile 30F depicts a quick shift-to-quick shift (QS2QS) maneuver, which is any tap downshift during intervals of little to no acceleration of the engine 12, i.e., an "engine speed-matched downshift". As with FIGS. 3A-E, trajectories are shown for input speed (trace $N_1$) and first and second input shaft speeds (respective traces $N_1$ and $N_2$).

The prior-requested shift to the first desired gear state (GS1) progresses between $t_1$ and $t_4$. According to the calibrated profile 30F, clutch torque (trace $T_{C1}$) for the offgoing clutch for the first desired gear state (GS1) is ramped down to zero between $t_1$ and $t_2$, reaching zero at $t_2$. The oncoming clutch for the first desired gear state (GS1), here the input clutch C2, is quickly stepped up to a calibrated level at $t_3$ midway through the shift to the first desired gear state (GS1). The affected speeds (traces $N_1$, $N_I$) ramp upward at a calibrated rate in response to the changing clutch torques.

Per the calibrated profile 30F, however, the first shift request is not allowed to complete upon detection of the change-of-mind shift at point 35. Instead, upon detection of the change-of-mind shift at point 35 the controller 16 immediately aborts the initially-requested shift at $t_4$, drops the clutch torque (trace $T_{C2}$) back to zero, and steps up the clutch torque (trace $T_{C1}$) for the prior offgoing clutch, i.e., input clutch C1, which now acts as the oncoming clutch for the change-of-mind shift in this example.

The controller 16 requests speed control of the engine 12 at about $t_5$, such as via request transmitted to an engine control module (not shown) if the controller 16 is limited to being a transmission control module, which causes the input speed (trace $N_1$) to rise at a calibrated rate. Synchronization of the input speed (trace $N_1$) and the second shaft speed (trace $N_2$) occurs at point 39. Upon synchronization, the controller 16 of FIG. 1 increases oncoming clutch torque (trace $T_{C1}$) at a calibrated ramp rate ($R_{CAL}$) at about $t_6$, once again via transmission of the clutch position control signals (arrow Px) to the affected clutches $C_1$ and $C_2$. A calibrated amount of time after synchronization, the controller 16 rapidly increases oncoming clutch torque, e.g., at $t_7$, and completes the change-of-mind shift to the second desired gear state (GS2).

The calibrated shift profile 30G of FIG. 3G depicts a torque interrupt-to-power-on downshift (TI2PD) maneuver. The prior-requested shift to the first desired gear state (GS1) progresses between $t_1$ and $t_3$. According to the calibrated shift profile 30G, the clutch torque (trace $T_{C1}$) for the offgoing clutch for the shift to the first desired gear state (GS1) is ramped down to zero between $t_1$ and $t_2$, reaching zero at $t_2$. The oncoming clutch for the first desired gear state (GS1), i.e., the input clutch C2, is ramped up to a calibrated level between $t_2$ and $t_3$ midway through the shift to the first desired gear state (GS1). During this same interval, the first shaft speed (trace $N_1$) increases along with the input speed (trace $N_1$), i.e., the speed of the engine 12, with the input speed (trace $N_1$) becoming synchronized with the first shaft speed (trace $N_1$) at about point 39.

Upon detection of the change-of-mind shift at point 35 the controller 16 immediately aborts the initially-requested shift at $t_3$, decreases the clutch torque (trace $T_{C2}$) at a calibrated rate and holds the clutch torque (trace $T_{C1}$) for the prior offgoing clutch, i.e., input clutch C1, at zero until $t_6$. Decreasing the clutch torque (trace $T_{C2}$) causes the input speed (trace $N_1$) to again rise at a calibrated rate. This rise in input speed (trace $N_1$), as indicated by arrow 41, continues until about $t_6$. Synchronization of the input speed (trace $N_1$) and the second shaft speed (trace $N_2$) occurs at point 139.

Upon such synchronization, the controller 16 of FIG. 1 increases oncoming clutch torque (trace $T_{C1}$) and drops offgoing clutch torque (trace $T_{C2}$) as in the clutch exhaust profile 45, once again via transmission of the clutch position control signals (arrow Px) to the affected input clutches $C_1$ and $C_2$. The change-of-mind shift is completed at about $t_7$.

Using the method 100, the controller 16 can apply any of the shift profiles 30A-30G of FIGS. 3A-G to quickly react to changing driver inputs through a wide range of change-of-mind shifts. The controller 16 is therefore configured to eliminate actual or perceived delay in the change-of-mind shift, thereby optimizing shift feel relative to conventional approaches. Continuous torque is transmitted during the change-of-mind shift, which in turn can limit driveline disturbances.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:
1. A vehicle comprising:
an engine;
a dual-clutch transmission (DCT) having a pair of input clutches, first and second input shafts, and a gearbox that contains separate oddly-numbered and evenly-numbered gear sets disposed on a corresponding one of the first and second input shafts, wherein an application of a designated one of the pair of input clutches connects the engine to a corresponding one of the oddly-numbered or evenly-numbered gear sets; and
a controller in communication with the pair of input clutches, wherein the controller includes a processor and tangible, non-transitory memory on which is recorded instructions for executing a requested change-of-mind shift of the DCT to a second desired gear state initiated after a prior-requested but not fully-executed shift of the DCT to a first desired gear state, wherein the controller is programmed with a plurality of different calibrated shift profiles, and wherein execution of the instructions causes the controller to:
detect the requested change-of-mind shift;
identify the second desired gear state;
abort the prior-requested shift to the first desired gear state immediately upon identifying the second desired gear state;
select one of the plurality of different calibrated shift profiles; and
shift the DCT to the second desired gear state using the selected calibrated shift profile corresponding to the detected change-of-mind shift, wherein the selected calibrated shift profile describes both a timing and a magnitude of required oncoming and offgoing clutch torques needed for achieving the second desired gear state.

2. The vehicle of claim 1, wherein the plurality of different calibrated shift profiles includes at least one power-on downshift-to-power-on downshift maneuver, an upshift-to-power-on downshift maneuver, a coasting downshift-to-power-on downshift maneuver, a power-on upshift-to-coasting upshift maneuver, a quick shift-to-quick shift maneuver, and a torque interrupt-to-power-on downshift maneuver.

3. The vehicle of claim 2, wherein the at least one power-on downshift-to-power-on downshift maneuver includes a first shift maneuver to the first or second input shaft from the same first or second input shaft, and a second shift maneuver from the first input shaft to the second input shaft or from the second input shaft to the first input shaft.

4. The vehicle of claim 1, wherein the controller is programmed to shift the DCT to the second desired gear state via the calibrated shift profile by decreasing the clutch torque for a designated offgoing clutch of the DCT according to a calibrated clutch exhaust profile immediately upon synchronization of a speed of the engine with a speed of the input shaft needed for achieving the second desired gear state.

5. The vehicle of claim 1, wherein the controller is programmed to request a temporary increase in a speed of the engine after detecting the change-of-mind shift to thereby synchronize the speed of the engine with a speed of the input shaft needed for achieving the second desired gear state.

6. A system comprising:
a dual-clutch transmission (DCT) having a pair of input clutches, first and second input shafts, and a gearbox that contains separate oddly-numbered and evenly-numbered gear sets disposed on a corresponding one of the first and second input shafts; and
a controller in communication with the pair of input clutches, wherein the controller includes a processor and tangible, non-transitory memory on which is recorded a plurality of different calibrated shift profiles and instructions for executing a requested change-of-mind shift of the DCT to a second desired gear state initiated after a prior-requested but not yet fully-executed shift of the DCT to a first desired gear state, wherein execution of the instructions causes the controller to:
  detect the requested change-of-mind shift;
  identify the second desired gear state;
  abort the prior-requested shift to the first desired gear state immediately upon identifying the second desired gear state;
  select one of the plurality of different calibrated shift profiles; and
  shift the DCT to the second desired gear state using the selected calibrated shift profile corresponding to the detected change-of-mind shift, wherein the selected calibrated shift profile describes a timing and a magnitude of required oncoming and offgoing clutch torques needed for achieving the second desired gear state.

7. The system of claim 6, wherein the plurality of different calibrated shift profiles includes at least one power-on downshift-to-power-on downshift maneuver, an upshift-to-power-on downshift maneuver, a coasting downshift-to-power-on downshift maneuver, a power-on downshift-to-coasting upshift maneuver, a quick shift-to-quick shift maneuver, and a torque interrupt-to-power-on downshift maneuver.

8. The system of claim 7, wherein the at least one power-on downshift-to-power downshift maneuver includes a first shift maneuver to the first or second input shaft from the same first or second input shaft, and a second shift maneuver from the first input shaft to the second input shaft or from the second input shaft to the first input shaft.

9. The system of claim 6, wherein the controller is programmed to receive a speed of an engine, and to shift the DCT to the second desired gear state via the calibrated shift profile by decreasing the clutch torque for a designated offgoing clutch of the DCT according to a calibrated clutch exhaust profile immediately upon synchronization of the received speed of an engine with a speed of the input shaft needed for achieving the second desired gear state.

10. The system of claim 9, wherein the controller is programmed to request a temporary increase in the speed of the engine after detecting the requested change-of-mind shift to thereby synchronize the speed of the engine with a speed of the input shaft needed for achieving the second desired gear state.

11. A method of controlling a change-of-mind shift in a vehicle having an engine and a dual-clutch transmission (DCT), wherein the change-of-mind shift is a requested shift of the DCT to a second desired gear state initiated after a prior-requested but not fully-executed shift of the DCT to a first desired gear state, the method comprising:
  detecting the requested change-of-mind shift via a controller;
  identifying the second desired gear state;
  aborting the prior-requested shift to the first desired gear state immediately upon identifying the second desired gear state;
  selecting, from a plurality of different calibrated shift profiles, a calibrated shift profile corresponding to the second desired gear state; and
  automatically shifting the DCT to the second desired gear state via the controller using a calibrated shift profile corresponding to the requested change-of-mind shift, wherein the calibrated shift profile describes a timing and a magnitude of required oncoming and offgoing clutch torques needed for achieving the second desired gear state.

12. The method of claim 11, wherein selecting from a plurality of shift profiles includes at least one power-on downshift-to-power-on downshift maneuver, an upshift-to-power-on downshift maneuver, a coasting downshift-to-power-on downshift maneuver, a power-on downshift-to-coasting upshift maneuver, a quick shift-to-quick shift maneuver, and a torque interrupt-to-power-on downshift maneuver.

13. The method of claim 12, including selecting, as the at least one power-on downshift-to-power-on downshift maneuver, a first shift maneuver to a first or second input shaft of the DCT from the same first or second input shaft, or a second shift maneuver from the first input shaft to the second input shaft or from the second input shaft to the first input shaft.

14. The method of claim 11, further comprising:
  receiving a speed of the engine; and
  shifting the DCT to the second desired gear state via the calibrated shift profile by dropping clutch torque for a designated offgoing clutch of the DCT according to a calibrated clutch exhaust profile immediately upon synchronization of the received speed of an engine with a speed of the input shaft needed for the second desired gear state.

15. The method of claim 14, further comprising:
  requesting a temporary increase in the speed of the engine after detecting the change-of-mind shift to thereby synchronize the speed of the engine with a speed of the input shaft needed for the second desired gear state.

* * * * *